(12) United States Patent
Colban et al.

(10) Patent No.: US 8,751,848 B2
(45) Date of Patent: Jun. 10, 2014

(54) SYSTEM AND METHOD FOR HANDLING A POWER OUTAGE

(75) Inventors: Erik Colban, San Diego, CA (US); George Calcev, Hoffman Estates, IL (US); Bin Chen, Schaumburg, IL (US); George Cummings, Gilbert, AZ (US)

(73) Assignee: Futurewei Technologies, Inc., Plano, TX (US)

( * ) Notice: Subject to any disclaimer, the term of this patent is extended or adjusted under 35 U.S.C. 154(b) by 92 days.

(21) Appl. No.: 13/411,118

(22) Filed: Mar. 2, 2012

(65) Prior Publication Data

US 2012/0226930 A1 Sep. 6, 2012

Related U.S. Application Data

(60) Provisional application No. 61/449,388, filed on Mar. 4, 2011.

(51) Int. Cl.
*G06F 1/00* (2006.01)

(52) U.S. Cl.
USPC ............................ 713/340; 370/329; 370/242

(58) Field of Classification Search
USPC ........................................................ 370/329
See application file for complete search history.

(56) References Cited

U.S. PATENT DOCUMENTS

| 2003/0012195 A1* | 1/2003 | Ohkubo et al. ............... 370/390 |
| 2012/0146799 A1* | 6/2012 | Bell et al. ...................... 340/635 |

OTHER PUBLICATIONS

Abnormal Outage Report in 802.16p IEEE C802.16p-10/0032 Dec. 31, 2010 Hung-Yu Wei, Ching-Chun Chou.*

Sift: A MAC Protocol for Event-Driven Wireless Sensor Networks Kyle Jamieson, Hari Balakrishnan, Y.C. Tay May 1, 2003.*
IEEE 802.16 Broadband Wireless Access Working Group IEEE C802.16p-11/0145 Handling Smart Meter Power Outage Jul. 10, 2011 Bin Chen, George Calcev, Erik Colban, Ronald Mao, Hung-Yu Wei, Ching-Chun Chou.*
IEEE 802.16 Broadband Wireless Access Working Group Supporting Power Outage Management for Smart Metering Applications Nov. 8, 2010 R. Golla, W. Bell, M. Lin, N. Himayat, S. Talwar, K. Johnsson, R. Mao.*
Golla, R., et al., "Power Outage Alarm for Smart Metering Applications," IEEE 802.16 Broadband Wireless Access Working Group <http://ieee802.org/16>, IEEE C802.16ppc-10/0054, Sep. 9, 2010, 3 pages.
Golla, R., et al., "Amendment text supporting involuntary power down reporting for smart metering applications," IEEE 802.16 Broadband Wireless Access Working Group <http://ieee802.org/16>, IEEE C802.16p-10/0033, Dec. 31, 2010, 4 pages.
Golla, R., et al., "Amendment text supporting involuntary power down reporting for smart metering applications," IEEE 802.16 Broadband Wireless Access Working Group http://ieee802.org/16, IEEE C802.16p-11/0015, Mar. 6, 2011, 4 pages.
"Air Interface for Broadband Wireless Access Systems," IEEE P802.16p/D3, IEEE WirelessMAN 802.16, Jan. 22, 2012, 55 pages.
"WirelessMAN-Advanced Air Interface for Broadband Wireless Access Systems," IEEE P802.16.1b/D2, IEEE WirelessMAN 802.16, Jan. 22, 2012, 82 pages.

* cited by examiner

*Primary Examiner* — Huy D Vu
*Assistant Examiner* — Kevin Cunningham
(74) *Attorney, Agent, or Firm* — Slater & Matsil, L.L.P.

(57) ABSTRACT

A method for reporting a power outage to a communications controller includes detecting the power outage, and selecting a transmission slot from a plurality of transmission slots in order to report the power outage to the communications controller, the transmission slot selected according to a non-uniform probability distribution function, the non-uniform probability distribution function is monotonic with time after the power outage. The method also includes transmitting a first power outage indicator to the communications controller in the transmission slot selected.

25 Claims, 12 Drawing Sheets

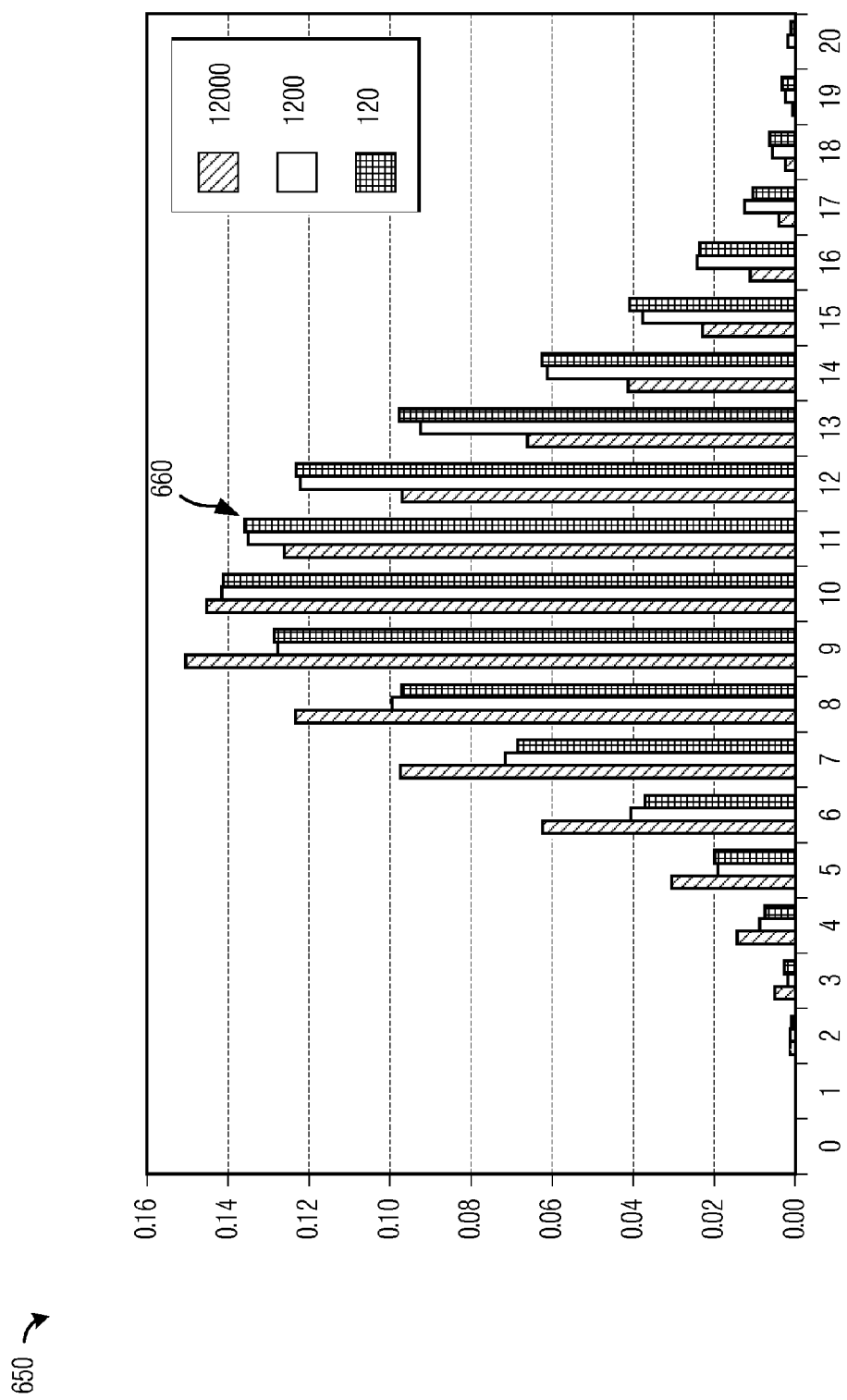

SYSTEM AND METHOD FOR HANDLING A POWER OUTAGE

This application claims the benefit of U.S. Provisional Application No. 61/449,388, filed on Mar. 4, 2011, entitled "Methods and Systems for Handling Power Outage," which application is hereby incorporated herein by reference.

TECHNICAL FIELD

The present disclosure relates generally to digital communications, and more particularly to a system and method for handling a power outage.

BACKGROUND

WiMAX compliant communications systems are based on the series of IEEE 802.16 technical standards and are used to provide wireless broadband access service. Similarly, the Third Generation Partnership Project (3GPP) Long Term Evolution (LTE) and Long Term Evolution Advanced (LTE-Advanced) series of technical standards also provide for wireless broadband access service. Specifically, the IEEE 802.16m and 3GPP TLE-Advanced technical standards are all International Mobile Telecommunications-Advanced (IMT-Advanced) candidate standards and their basic physical technologies are similar, for example, both support Multiple Input, Multiple Output (MIMO) with Orthogonal Frequency Division Multiple Access (OFDMA) operation. However, some detailed technologies are different, especially in channel structure and signaling.

Machine to Machine (M2M) communications is a service based on a wireless communications system. Currently, both IEEE 802.16 and 3GPP LTE/LTE-Advanced define their own M2M requirements and features lists. In IEEE 802.16, M2M communications is being specified in projects P802.16p and P802.16.1b with system requirements including: low power consumption, support for large numbers of communications devices, small burst transmission, and security support.

Many M2M devices are powered by a centralized power delivery system, such as a power grid that is used to provide power to consumers, and typically do not include a self-contained power system. As such, if the centralized power delivery system fails, e.g., there is a power outage, a large number of M2M devices may lose power and cannot maintain M2M communications. Normally, unless the power outage interrupts an on-going communications, a server serving the M2M devices, and consequently, a utility company that is providing the power to the M2M devices, may not know that power has been lost and potentially many M2M devices are without power.

Therefore, there is a need for a system and method for handling a power outage.

SUMMARY OF THE DISCLOSURE

Example embodiments of the present disclosure which provide a system and method for handling a power outage.

In accordance with an example embodiment of the present disclosure, a method for reporting a power outage to a communications controller is provided. The method includes detecting the power outage, and selecting a transmission slot from a plurality of transmission slots in order to report the power outage to the communications controller, the transmission slot selected according to a non-uniform probability distribution function, the non-uniform probability distribution function is monotonic with time after the power outage. The method also includes transmitting a first power outage indicator to the communications controller in the transmission slot selected.

In accordance with another example embodiment of the present disclosure, a method for responding to a power outage is provided. The method includes receiving in a transmission slot a first power outage indicator from a served device out of several devices being served, use of the transmission slot having been selected by the served device according to a non-uniform probability distribution function. The method also includes allocating a network resource to the served device, and transmitting an allocation of the network resource to the served device.

In accordance with another example embodiment of the present disclosure, a device is provided. The device includes a processor, and a transmitter operatively coupled to the processor. The processor detects a power outage, and selects a transmission slot from a plurality of transmission slots in order to report the power outage to a communications controller, the transmission slot selected according to a non-uniform probability distribution function, the non-uniform probability distribution function is monotonic with time after the power outage. The transmitter transmits a first power outage indicator to the communications controller in the transmission slot selected.

In accordance with another example embodiment of the present disclosure, a communications controller is provided. The communications controller includes a receiver, a processor operatively coupled to the receiver, and a transmitter operatively coupled to the processor. The receiver receives in a transmission slot a first power outage indicator from a served device out of several devices being served, use of the transmission slot having been selected by the served device according to a non-uniform probability distribution function. The processor allocates a network resource to the served device. The transmitter transmits an allocation of the network resource to the served device.

One advantage of an embodiment is that contention for access to a transmission slot to transmit an initial power outage indicator is spread out over a plurality of transmission slots according to a non-uniform probability distribution function. Therefore, the probability of a base station receiving the ranging code from at least one M2M device is high.

A further advantage of an embodiment is that the use of the non-uniform probability distribution function is independent of the number of M2M devices that are affected by a power outage and are configured to transmit the initial power outage indicator. Therefore, any number of M2M devices (up to a practical limit set by a number of transmission slots available for transmitting the initial power outage indicator, an amount of time available for transmission of the initial power outage indicator once the power outage occurs, and the like) may be supported.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 6b illustrates an example plot of a probability of a certain number of M2M devices capable of transmitting a power outage indicator in a transmission slot wherein it is the only M2M device transmitting in the transmission slot according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to a handling a power outage in a communications system with M2M devices without self-contained power supplies. For example, a M2M device upon detection of a power outage selects a transmission slot from a plurality of transmission slots for use in transmitting an initial power outage indicator to its base station. The selection of the transmission slot is according to a non-uniform probability function with a monotonically increasing or decreasing probability of transmission slot selection as time increases. The M2M device waits until an arrival of its selected transmission slot and transmits the initial power outage indicator. For example, a server receives an initial power outage indicator in a transmission slot from a M2M device being served, the transmission slot having been selected by the M2M device according to a non-uniform probability distribution function.

The present disclosure will be described with respect to example embodiments in a specific context, namely a WiMAX compliant communications system with support for M2M devices. The disclosure may also be applied, however, to other standards compliant communications system with support for M2M devices, such as the Third Generation Partnership Project (3GPP) Long Term Evolution (LTE) compliant communications systems, IEEE 802.16 compliant communications systems, and the like, as well as non-standards compliant communications systems that support M2M devices.

Figure 1:
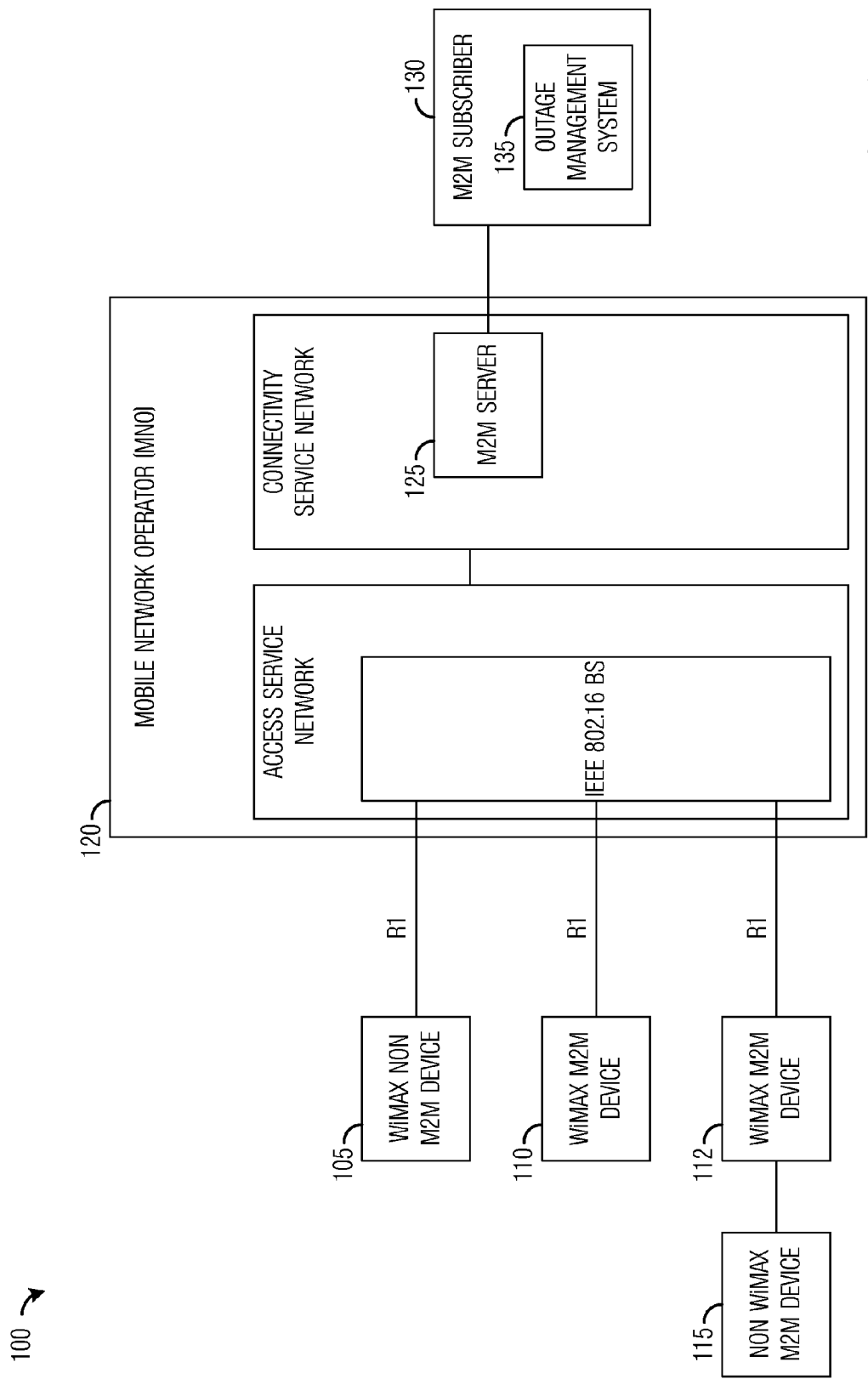
FIG. 1 illustrates an example M2M communications system in a WiMAX compliant communications system according to example embodiments described herein.

FIG. 1 illustrates an example of a M2M communications system in a WiMAX compliant communications system 100. WiMAX compliant communications system 100 includes a WiMAX non-M2M device 105, WiMAX M2M devices 110 and 112, as well as a non WiMAX M2M device 115. The devices may be coupled to a mobile network operator (MNO) 120 that provides an access network as well as a M2M server 125 that may be used to aggregate information from the M2M devices and provide the information (aggregated or not aggregated) to an M2M subscriber 130.

M2M subscriber 130 may also include an outage management system (OMS) 135 that may be responsible for responding to a power outage. As an example, OMS 135 may reconfigure centralized power delivery systems to provide power to as many M2M devices impacted by the power outage as possible. As another example, OMS 135 may initiate a procedure to determine a cause of the power outage and then repair the cause of the power outage. Although shown in FIG. 1 as being in M2M subscriber 130, OMS 135 may be a standalone entity.

While it is understood that communications systems may employ multiple communicating devices, only one WiMAX non-M2M device, two WiMAX M2M devices, and one non WiMAX M2M device are illustrated for simplicity.

Figure 2A:
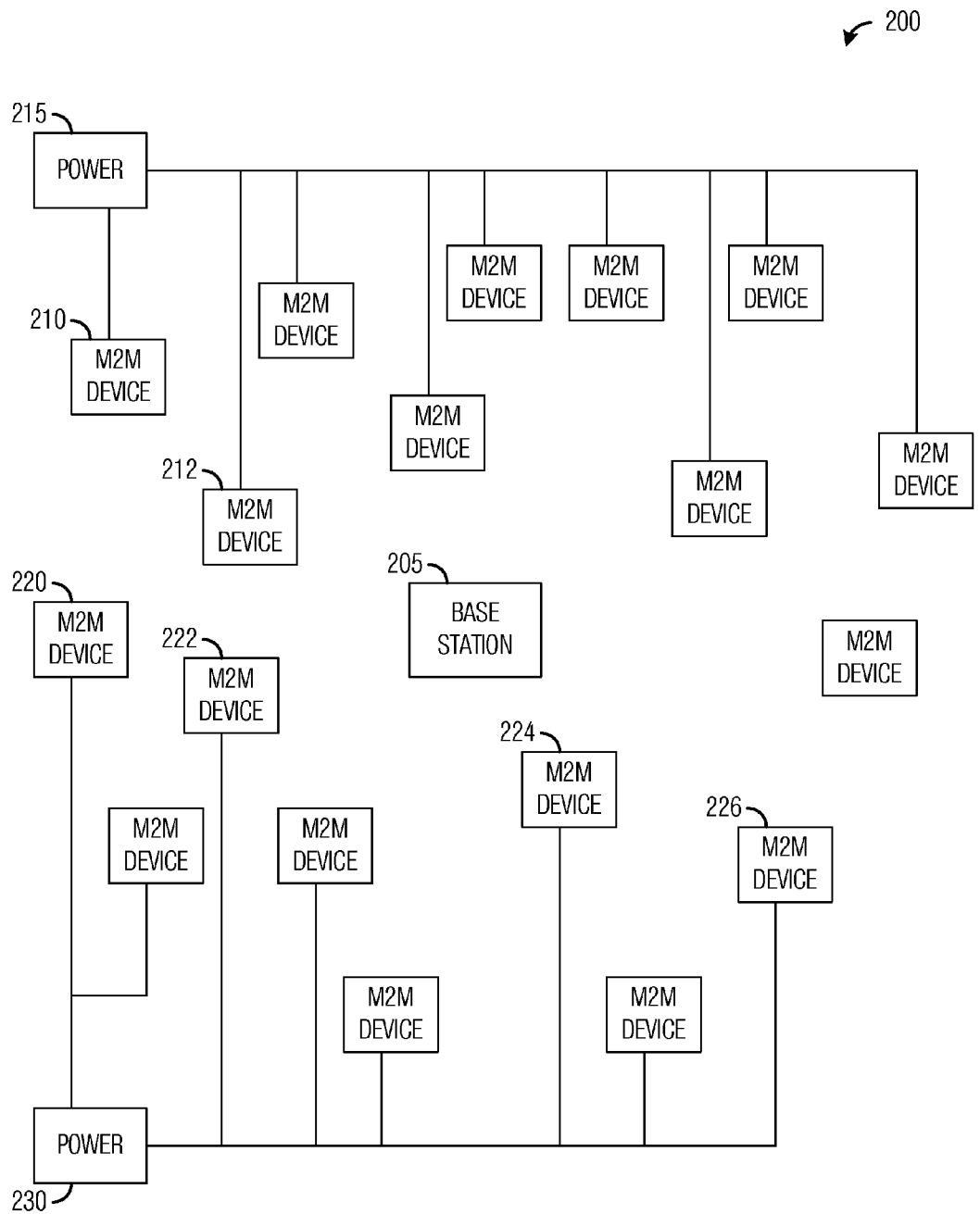
FIG. 2a illustrates an example communications system with a plurality of M2M devices according to example embodiments described herein.

FIG. 2a illustrates a communications system 200 with a plurality of M2M devices. Communications system 200 includes a base station 205 providing access for the plurality of M2M devices, including M2M devices 210, 212, 220, 222, 224, and 226. Some of the M2M devices in the plurality of M2M devices may be powered by a centralized power delivery system, such as a power grid, while others may be self powered, e.g., by way of battery, solar power, and the like. As shown in FIG. 2a, some of the plurality of M2M devices are powered by a first centralized power delivery system 215, while others of the plurality of M2M devices are powered by a second centralized power delivery system 230.

Figure 2B:
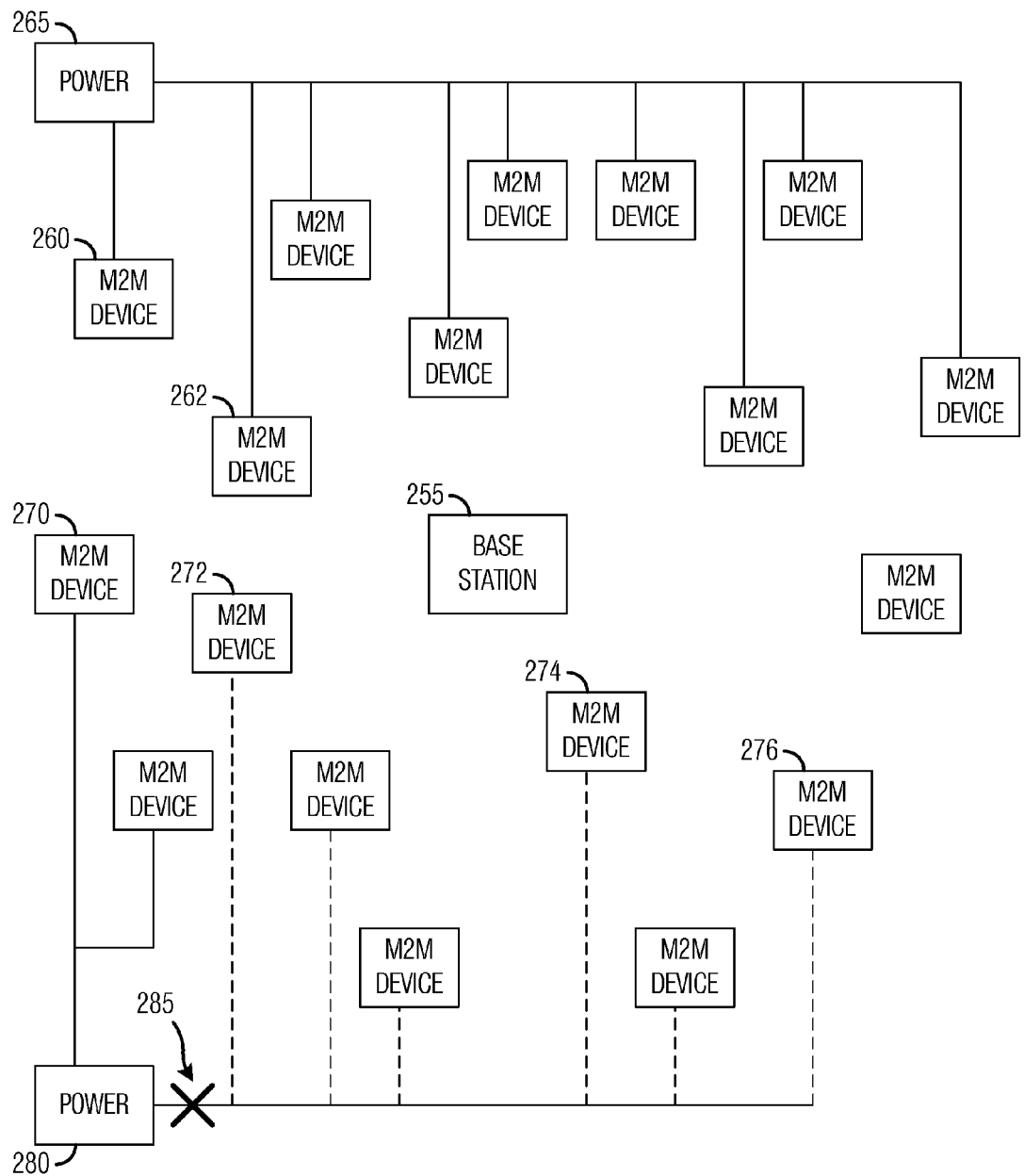
FIG. 2b illustrates an example communications system with a plurality of M2M devices and a failure in a centralized power delivery system according to example embodiments described herein.

FIG. 2b illustrates a communications system 250 with a plurality of M2M devices and a failure in a centralized power delivery system. Communications system 250 includes a base station 255 providing access for the plurality of M2M devices, including M2M devices 260, 262, 270, 272, 274, and 276. As shown in FIG. 2b, some of the plurality of M2M devices are powered by a first centralized power delivery system 265, while others of the plurality of M2M devices are powered by a second centralized power delivery system 280.

However, a failure 285 in second centralized power delivery system 280 has cut power to a significant number of M2M devices, including M2M devices 272, 274, and 276. Without power, the M2M devices may not be capable of maintaining communications with base station 255 for an extended amount of time. It is noted that in an implementation wherein a single base station serves tens of thousands of M2M devices, a fault in the power grid may result in thousands of M2M devices losing power.

Typically, a M2M device has finite amount of charge stored in a capacitor that provides power for a duration on the order of 150 to 250 milliseconds to allow the M2M device to carry out a notification procedure required to notify the communications system, e.g., through the M2M device's serving base station, about the power outage. The duration may be referred to as the M2M device's time to live. The relatively short time limit may constrain possible solutions for notifying the communications system about the power outage. Also, since the communications system does not receive any prior indication about a time of the power outage nor a number of M2M devices affected, the base stations in the communications system may need to be able to handle a power outage at any time without warning and without knowing for how many M2M devices they may need to allocate network resources for so that the M2M devices can transmit the power outage notification to the communications system.

Furthermore, when a power outage occurs, the M2M devices impacted by the power outage may be in different communications states which may include a connected state with and without active network resource allocation, and an idle state. Hence, a procedure for M2M devices in the connected state may not be feasible for M2M devices in the idle state. Even for M2M devices in the connected state, a procedure for transmitting the power outage notification may vary since a M2M device with a network resource allocation may use the network resource allocation to transmit the power outage notification, while a M2M device without a network resource allocation may first request an allocation from its serving base station before it can transmit the power outage notification. Since it is expected that a M2M device will generally spend most of its time in the idle state and only enter the connected state for short periods of time to transmit small amounts of information, it may be very difficult to predict how often and for how long a M2M device will be in the connected state. Additionally, how often and how long a M2M device is in the connected state may vary from application to application.

Figure 3:
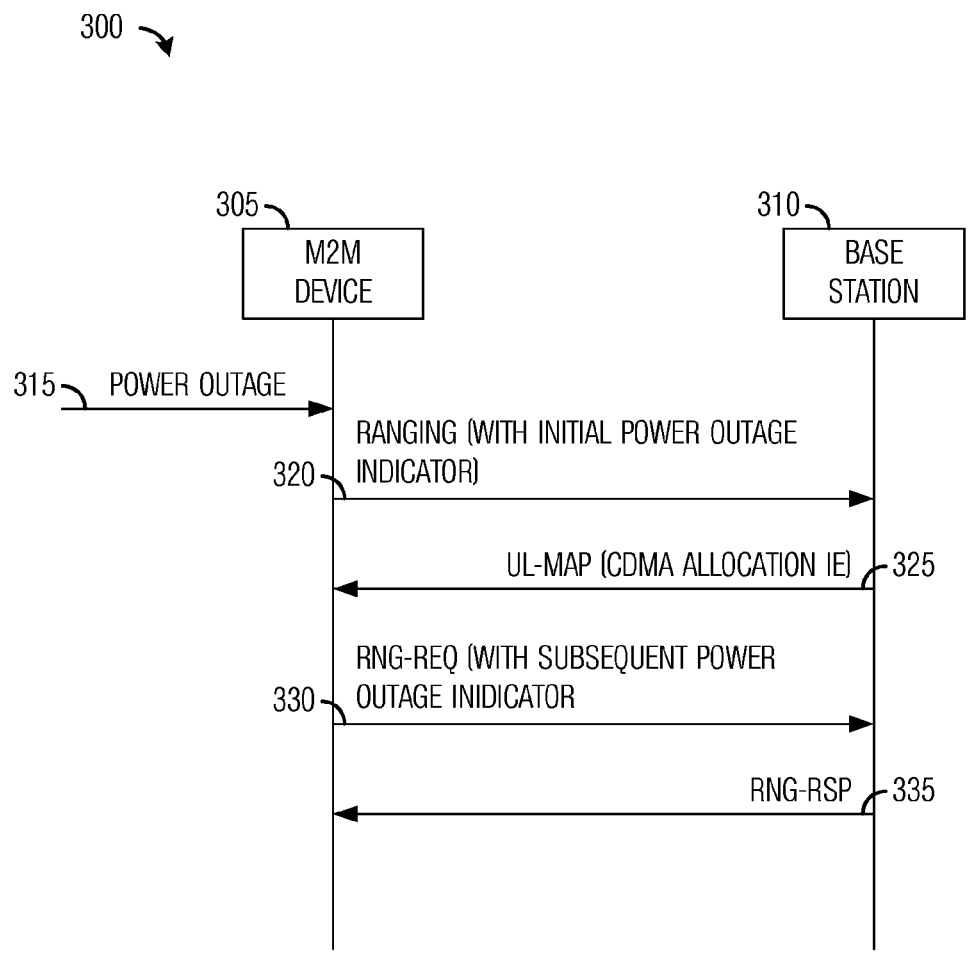
FIG. 3 illustrates an example message exchange in handling a power outage in a communications system according to example embodiments described herein.

FIG. 3 illustrates a message exchange 300 in handling a power outage in a communications system. Message exchange 300 may involve messages exchanged between a M2M device 305 and a base station 310 that is serving M2M device 305 as M2M device 305 and base station 310 handles a power outage that impacts M2M device 305.

M2M device 305 detects a power outage (shown as event 315), which forces M2M device 305 to rely on a charge stored on a capacitor to provide it with a limited amount of time, e.g., on the order of 150 to 250 milliseconds, in which it is to report to base station 310 that a power outage has occurred.

In a WiMAX compliant communications system, there are random access transmission slots referred to as ranging slots where any device operating in the WiMAX compliant communications system, such as a M2M device (e.g., M2M device 305), may use to transmit a ranging code to its serving base station (e.g., base station 310 for M2M device 305). In a 3GPP LTE compliant communications system, there are periodic random access channels referred to as random access channels (RACH) where any device operating in the 3GPP LTE compliant communications system, such as a M2M device, may use to transmit a preamble to its serving evolved NodeB (eNB).

As an example, in a WiMAX compliant communications system, the ranging slots may be used by M2M device 305 to report a power outage to base station 310 by transmitting an initial power outage indicator in the form of a ranging code in the ranging slot in place of or in addition to information typically transmitted in a ranging slot, e.g., a ranging code having a specified value (shown as event 320). It is noted that the ranging code used as the initial power outage indicator may be a prespecified value specified by a technical standard, an operator of the communications system, or a configurable parameter configured during initialization, power up, and the like. However, other values may be used to indicate a power outage. The initial power outage indicator transmitted in the ranging slot may be spread with a code division multiple access (CDMA) spreading code to help reduce a probability of collision with a transmission(s) made by other device(s) in the WiMAX compliant communications system.

As another example, in a 3GPP LTE compliant communications, the RACHs may be used by a M2M device to report a power outage to base station by transmitting an initial power outage indicator (e.g., a specified preamble). The specified preamble may be specified by a technical standard, an operator of the communications system, or it may be a configurable parameter configured during initialization, power up, and the like.

However, rather than transmitting the initial power outage indicator in a first available transmission slot (e.g., a ranging slot in a WiMAX compliant communications system, and a RACH in a 3GPP LTE compliant communications system), which may lead to collisions if there are multiple M2M devices impacted by the power outage, M2M device 305 may select a transmission slot out of a plurality of transmission slots that will become available during the time that it has before its capacitor discharges (e.g., 150 to 250 milliseconds). As an example, in a WiMAX compliant communications system, there may be as many as 100 ranging slots available for transmission within a time interval of 250 milliseconds.

According to an example embodiment, M2M device 305 may select a transmission slot from the plurality of transmission slots that will be available for use prior to its capacitor discharges completely according to a non-uniform probability distribution function where the probability of selecting a particular transmission slot increases the further the transmission slot is away from the occurrence of the power outage. In other words, the probability of selecting a particular transmission slot increases with time.

According to an example embodiment, it may be possible to utilize a mapping of the transmission slot numbers to actual transmission slots so that when the transmission slots are arranged in time, the probability of each transmission slot does not increase monotonically or decrease monotonically with time. In other words, transmission slot numbers may be assigned probabilities according to the non-uniform probability distribution function with larger transmission slot numbers corresponding to increased (or decreased) probability. However, when mapped to actual transmission slots, the transmission slot numbers may not be mapped to the actual transmission slots in numerical sequence with a one to one correspondence, instead, an alternate mapping of the transmission slot numbers to actual transmission slots may be used. Depending on the mapping of the transmission slot numbers to actual transmission slots, it may be possible to achieve an effect similar to a permutation of the transmission slot numbers.

As an example, consider a situation with four possible transmission slots, numbered 1 to 4 and their corresponding probabilities increase monotonically with time. However, the respective transmission slots do not map in sequence to actual transmission slots, e.g., one example mapping of transmission slot numbers may be transmission slot 1, transmission slot 4, transmission slot 2, and transmission slot 3 being mapped to the first, second, third, and fourth transmission slots after an occurrence of a power outage. Therefore, a permutation of the transmission slot numbers is achieved.

However, if the respective transmission slots do map in sequence to actual transmission slots, e.g., one example mapping of transmission slot number may be transmission slot 1, transmission slot 2, transmission slot 3, and transmission slot 3 being mapped to the first, second, third, and fourth transmission slots after an occurrence of a power outage, i.e., a one to one mapping, then the probabilities will increase monotonically with time. It is noted that the example mappings are two examples of a large number of possible mappings and is provided for discussion purposes only.

Examples of the non-uniform probability distribution function include distribution functions with an exponential cumulative distribution function expressible as $$F(t) = \frac{N^{t/b} - 1}{N - 1},$$

where b is a backoff window size, t is a transmission slot number (prior to the mapping of the transmission slot numbers to actual transmission slots if such a mapping is used), and N is a value of a configurable system parameter (e.g., an Abnormal Power Down Ranging Opportunity Selection Parameter in a WiMAX compliant communications system), monotonically increasing probability distribution functions, monotonically decreasing probability distribution functions, and the like. A backoff window may be a plurality of transmission slots available for use by a M2M device while it is being powered by its capacitor, i.e., its time to live. As an example, an M2M device with a time to live of approximately 250 millisecond operating in a WiMAX compliant communications system where the base station provides 2 ranging slots every 5 millisecond may apply a backoff window size of 100 ranging slots. A detailed description of the non-uniform probability distribution function and its use in selecting a transmission slot is provided below.

Base station 310, upon reception of the initial power outage indicator in the transmission slot may respond by allocating a transmission opportunity for M2M device 305. In a WiMAX compliant communications system, base station 310 may transmit the allocation to M2M device 305 in the form of a UL-MAP (shown as event 325).

In general, the receipt of the initial power outage indicator in the transmission slot by base station 310 may serve to notify base station 310 that a power outage has occurred. However, due to the random access nature of the transmission slots, base station 310 may not have knowledge of an originator of the initial power outage indicator. In other words, base station 310 may not know that M2M device 305 transmitted the initial power outage indicator. As such, base station 310 may attempt to determine the origin of the initial power outage indicator.

However, since base station 310 does know that a power outage has occurred and that time may be limited for the M2M device that transmitted the initial power outage indicator, base station 310 may expedite its allocation of the transmission opportunity. Additionally, base station 310 may forward the initial power outage indicator (or a representation thereof) to other entities in the communications system. As an example, base station 310 may forward the initial power outage indicator to a M2M server(s), the M2M subscriber, and/or an outage management system (OMS) in the communications system to inform them that a M2M device has reported that a power outage has occurred. The M2M server(s), the M2M subscriber and/or the OMS may decide on further action. As an example, the M2M server(s) (and/or the M2M subscriber or the OMS) may request that base station 310 identify the M2M device that reported the power outage, identify an extent of the power outage, identify a nature of the power outage, and the like.

If M2M device 305 has sufficient power to receive the allocation of the transmission opportunity, M2M device 305 may transmit a subsequent power outage indication in the transmission opportunity that includes information to identify itself, a nature of the power outage, and the like (shown as event 330). As an example, in a WiMAX compliant communications system, M2M device 305 may transmit a request message, such as a RNG-REQ message or a AAI-RNG-REQ message, to base station 310. The request message may include the subsequent power outage indicator, which may include information identifying M2M device 305 (such as its identifier, type, and the like), information regarding a nature of the power outage (such as time of occurrence, severity, and the like), information regarding neighboring M2M devices impacted if any, and the like. As an example, the subsequent power outage indicator may include a binary value 1110.

Base station 310, upon receipt of the subsequent power outage indicator transmitted by M2M device 305 in the transmission opportunity, may transmit a response message to M2M device 305 (shown as event 335). In a WiMAX compliant communications system, the response message sent to M2M device 305 may be a RNG-RSP message. As an example, the response message may instruct M2M device 305 to power down if it has not already done so.

In addition to responding to the subsequent power outage indicator transmitted by M2M device 305, base station 310 may also forward the subsequent power outage indicator to other entities in the communications system. Since the subsequent power outage indicator transmitted by M2M device 305 identifies M2M device 305, as well as potentially identifies the nature of the power outage, base station 310 may be able to direct the subsequent power outage indicator to a server directly responsible for M2M device 305. As an example, if M2M device 305 is a weather sensor, then base station 310 may send the subsequent power outage indicator to a server responsible for weather services. Similarly, if M2M device 305 is a security sensor, then base station 310 may send the subsequent power outage indicator to a security monitoring center. With the additional information provided in the subsequent power outage indicator transmitted by M2M device 305, base station 310 may be able to target its response to the power outage indicator (the initial power outage indicator originally transmitted in event 320 or the subsequent power outage indicator transmitted in event 330 or both power outage indicators).

It is noted that M2M device 305 may lose power after or shortly after transmitting the initial power outage indicator in the transmission slot shown as event 320, so it may not be able to receive the allocation of the transmission opportunity (event 325), transmit the subsequent power outage indicator regarding the power outage in the transmission opportunity (event 330), and/or receive the response message from base station 310 (event 335). It may also be possible that M2M device 305 may have sufficient power to receive the allocation of the transmission opportunity (event 325) but not for events 330 and 335. Similarly, M2M device 305 may have sufficient power to receive the allocation of the transmission opportunity (event 325) transmit the subsequent power outage indicator regarding the power outage in the transmission opportunity (event 330) but not for event 335. Therefore, events 325, 330, and/or 335 may be optional events.

Figure 4:
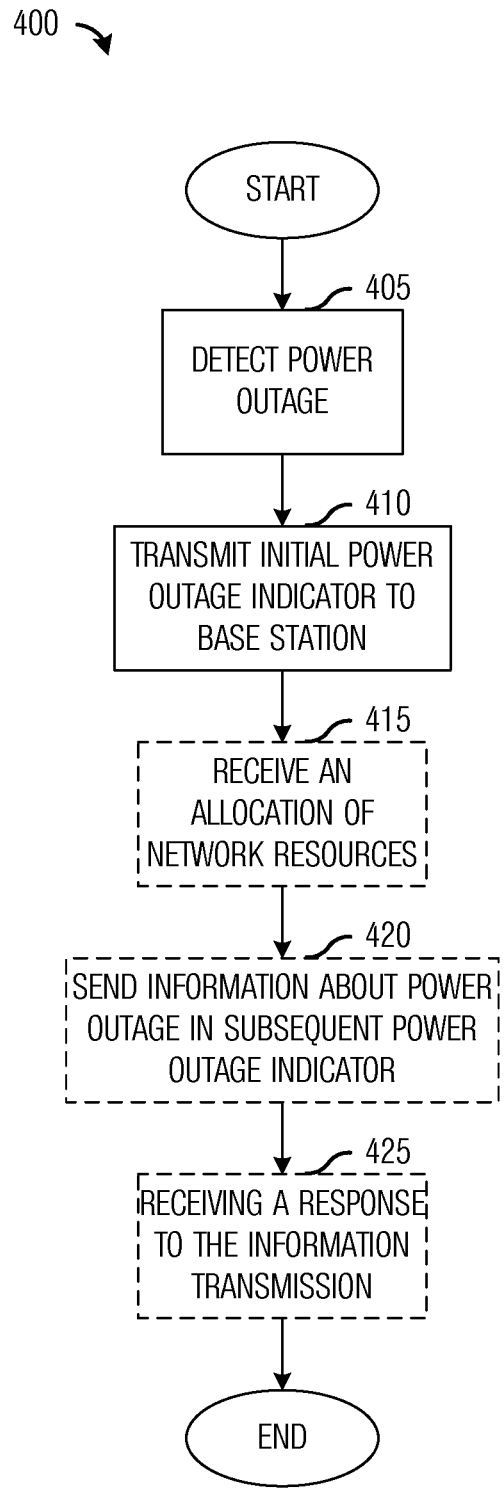
FIG. 4 illustrates an example flow diagram of operations in a M2M device as the M2M device handles a power outage according to example embodiments described herein.

FIG. 4 illustrates a flow diagram of operations 400 in a M2M device as the M2M device handles a power outage.

Operations 400 may be indicative of operations occurring in a M2M device, such as M2M device 305, as the M2M device detects a power outage and transmits an initial power outage indicator to a base station that is serving the M2M device.

Operations 400 may begin with the M2M device detecting a power outage (block 405). After the M2M device detects the power outage, the M2M device may transmit an initial power outage indicator to the base station (block 410). As an example, the initial power outage indicator may be a predetermined code or a predetermined waveform, which may be specified by a sequence of bits, such as a ranging code or a preamble. It is noted that the ranging code or the preamble used as the initial power outage indicator may be a prespecified value specified by a technical standard or an operator of the communications system, or a configurable parameter configured during initialization, power up, and the like.

According to an example embodiment, the M2M device may transmit the initial power outage indicator in a transmission slot out of a plurality of transmission slots available for use by the M2M device, where the transmission slot is selected from the plurality of transmission slots according to a non-uniform probability distribution function. The non-uniform probability distribution function may increase (or decrease) monotonically with time, meaning that a probability of selecting a first transmission slot corresponding to time T+1 is at least equal to or greater than (or at most equal to or less than) a probability of selecting a second transmission slot corresponding to slot number T, where T+1>T. It is noted that transmission slot numbers of the transmission slots may be mapped in such a way so that when ordered according to the transmission slot numbers, the probability of the respective transmission slots are no longer monotonically increasing (or decreasing) in time. However, the underlying non-uniform probability distribution function used to assign selection probabilities for the transmission slots retain its monotonically increasing (or decreasing) in time nature. Examples of non-uniform probability distribution functions include exponential distribution functions, such as an distribution function with a cumulative distribution function expressible as $$F(t) = \frac{N^{t/b} - 1}{N - 1},$$

where b is a backoff window size, t is a transmission slot, and N is a value of a configurable system parameter (e.g., an Abnormal Power Down Ranging Opportunity Selection Parameter in a WiMAX compliant communications system), monotonically increasing probability distribution functions, monotonically decreasing probability distribution functions, and the like. As a general example of a non-uniform probability function, let p be a probability of selecting a transmission slot T, then the probability of selecting transmission slot T+1 may be expressible as kp, where k is greater than 1 for monotonically increasing probability distribution functions and k is less than 1 for monotonically decreasing probability distribution functions. It is noted that in expression $$F(t) = \frac{N^{t/b} - 1}{N - 1},$$
if $N = k^b$, then the expression follows the general example of the non-uniform probability function. Illustrative examples of the selection of a transmission slot by the M2M device are presented in detail below.

Figure 5:
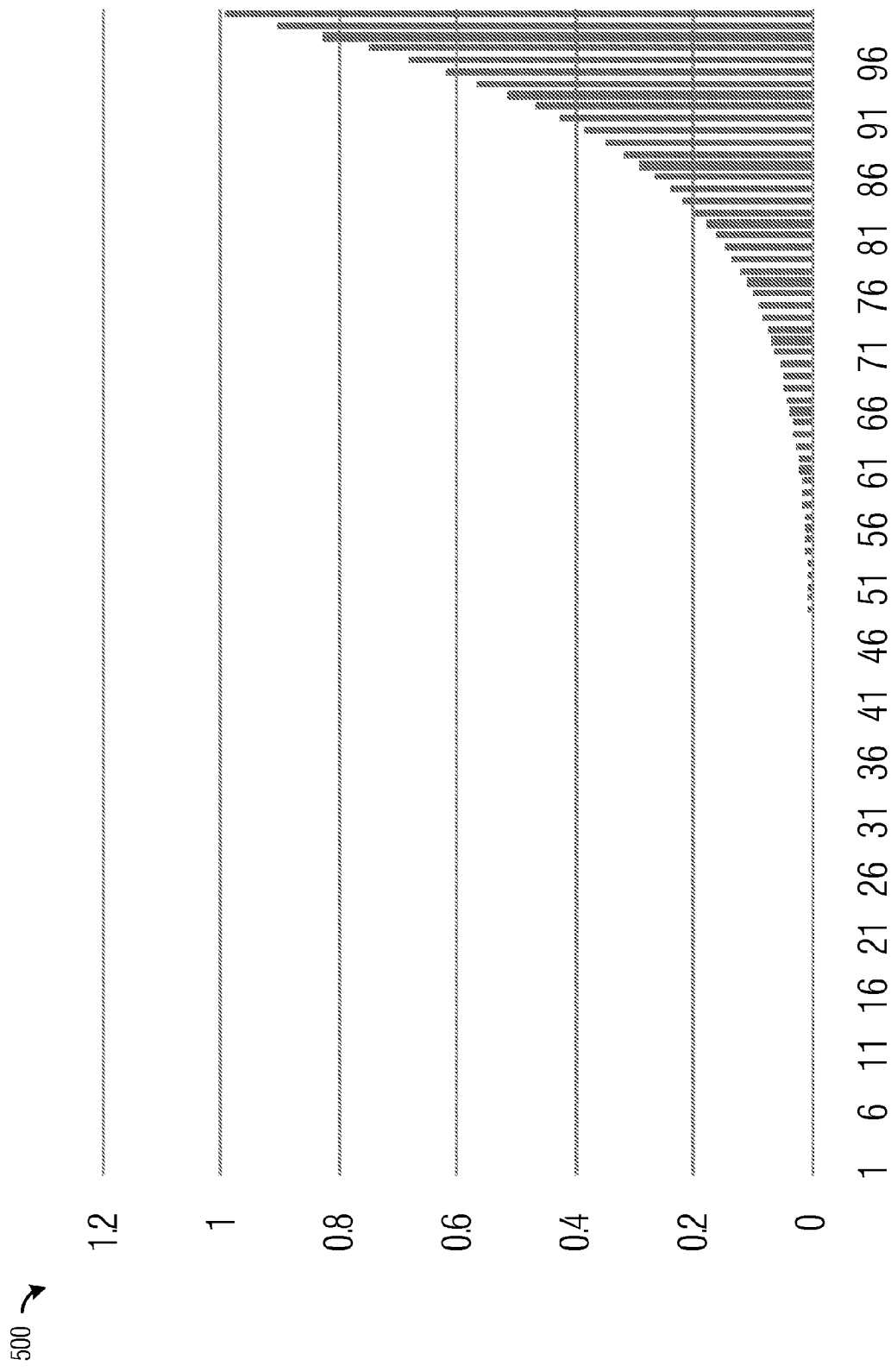
FIG. 5 illustrates an example cumulative distribution function for an example non-uniform probability function according to example embodiments described herein.

FIG. 5 illustrates a cumulative distribution function 500 for an example non-uniform probability function. As shown in FIG. 5, a horizontal axis represents transmission slots ordered by time (which, in a WiMAX compliant communications system may be ranging slots, while in a 3GPP LTE compliant communications system may be RACHs) and a vertical axis represents a probability that a transmission slot or any prior slot is selected by a M2M device. It is noted that for the early transmission slots, e.g., transmission slots 46 and earlier, the probability is so close to zero that their probabilities are not visible. However, the probability is not equal to zero. Clearly, as time increases from the occurrence of the power outage, the probability increases monotonically, and eventually, the probability of selecting a transmission slot approaches 1. A similar cumulative distribution function may be displayed for a non-uniform probability function that decreases monotonically. In such a cumulative distribution function, the probability decreases monotonically and eventually approaches 0. It is noted that an optional mapping of the transmission slot numbers to actual transmission slots is not shown in FIG. 5.

Figure 6A:
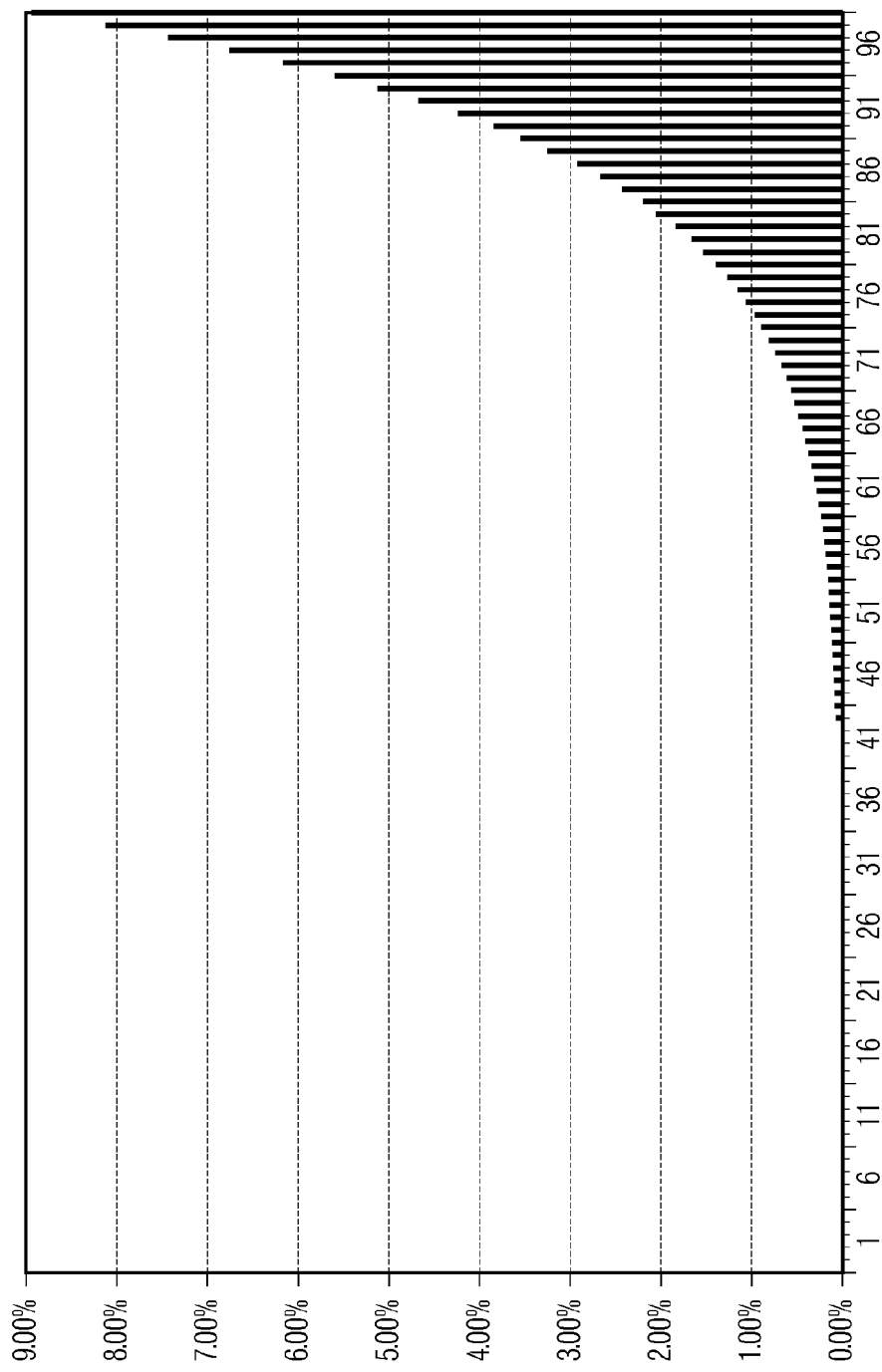
FIG. 6a illustrates an example plot of an expected percentage of M2M devices selecting a particular transmission slot according to example embodiments described herein.

FIG. 6a illustrates a plot 600 of an expected percentage of M2M devices selecting a particular transmission slot. As shown in FIG. 6a, a horizontal axis represents transmission slots ordered by time and a vertical axis represents a percentage of M2M devices. It is noted that for the early transmission slots, e.g., transmission slots 46 and earlier, the percentage is so close to zero that their percentages are not visible. However, the percentages are not equal to zero. Clearly, as time increases from the occurrence of the power outage, the percentages increase monotonically, and eventually, the percentages of M2M devices selecting a particular transmission slot approaches 9 percent. It is noted that an optional mapping of the transmission slot numbers to actual transmission slots is not shown in FIG. 6a.

FIG. 6b illustrates a plot 650 of a probability of a certain number of M2M devices capable of transmitting a power outage indicator in a transmission slot wherein it is the only M2M device transmitting in the transmission slot. Equivalently, plot 650 illustrates the probability of a certain number of transmission slots being selected by a single M2M device. Plot 650 provides performance evaluation results for three different configurations: a first configuration wherein there are 12000 M2M devices impacted by a power outage, a second configuration wherein there are 1200 M2M devices impacted by a power outage, and a third configuration wherein there are 120 M2M devices impacted by a power outage. In plot 650, a horizontal axis represents a number of transmission slots accessed by one M2M device and a vertical axis represents a probability.

As an example, considering vertical bars 660 corresponding to 11 transmission slots. Plot 650 is illustrating that for the case where there are 12000 M2M devices impacted by a power outage, approximately 12.5 percent of the time when the performance evaluations were performed, there were 11 transmission slots individually accessed by separate M2M devices, while for the cases where there are 1200 and 120 M2M devices, the percentages were approximately 13.5 percent of the time. It is noted that the use of the non-uniform probability distribution function to select the transmission slot out of the plurality of transmission slots is relatively independent of the number of M2M devices impacted by the power outage. Therefore, the example embodiments presented herein are relatively immune to the number of M2M devices affected by a power outage, which is generally unknown prior to the occurrence of the power outage. Furthermore, it is also noted that for zero transmission slots, the probability was approximately zero, indicating that were substantially no instances where all M2M devices impacted by a power outage were unable to obtain individual access to a transmission slot.

Referencing back now to FIG. 4, however, as discussed previously, due to the random access nature of the transmission slot, the base station may not be able to determine which M2M device has experienced the power outage and transmitted the initial power outage indicator. Therefore, if the base station wishes to obtain more information regarding the power outage, additional operations may be needed.

The M2M device may receive an allocation of a transmission opportunity from the base station (block 415). The transmission opportunity may give the M2M device a chance to provide more detailed information about the power outage, which it may transmit to the base station in the form of a subsequent power outage indicator (block 420). As an example, in a WiMAX compliant communications system, the M2M device may transmit a request message, such as a RNG-REQ message including a binary sequence 1110, to the base station. As an example, the M2M device may transmit the subsequent power outage indicator in the transmission opportunity to identify itself, a nature of the power outage, and the like.

The M2M device may receive a response message from the base station (block 425). As an example, in a WiMAX compliant communications system, the response message received by the M2M device may be a RNG-RSP message. As noted previously, depending on the amount of charge in the M2M device's capacitor, the M2M device may only be able to perform none, some, or all of blocks 415, 420, and 425.

Figure 7:
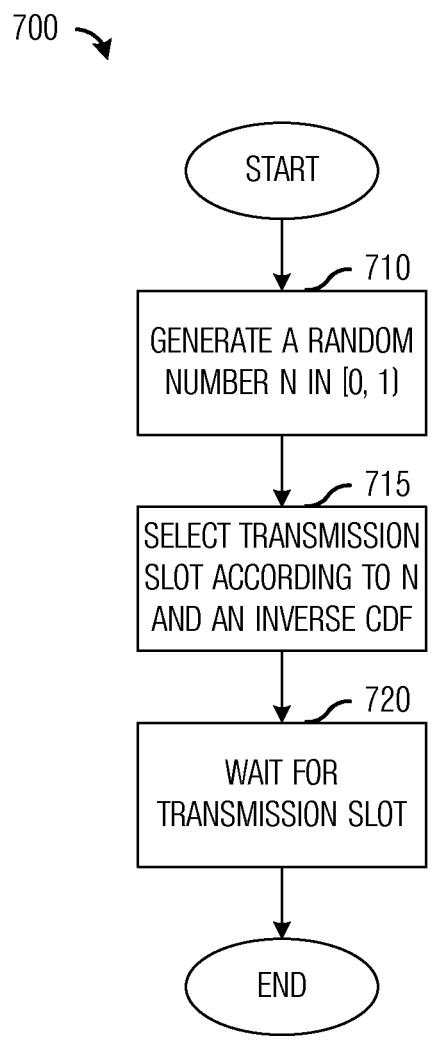
FIG. 7 illustrates an example flow diagram of operations in a M2M device as the M2M device selects a transmission slot according to a first example embodiment according to example embodiments described herein.

FIG. 7 illustrates a flow diagram of operations 700 in a M2M device as the M2M device selects a transmission slot according to a first example embodiment. Operations 700 may be indicative of operations occurring in a M2M device, such as M2M device 305, as the M2M device selects a transmission slot out of a plurality of transmission slots according to a non-uniform probability distribution function in order to transmit an initial power outage indicator to a base station serving the M2M device.

Operations 700 may begin with the M2M device generating a random number (block 710). As an example, the M2M device may generate a random number having a uniform distribution ranging from [0, 1). However, other random number ranges may also be used. The M2M device may then make use of an inverse cumulative distribution function of the non-uniform probability distribution function, such as shown in FIG. 5, to select a transmission slot (or a transmission slot number) from the plurality of transmission slots (block 715). As an example, the M2M device may use the generated random number to select the transmission slot (or the transmission slot number). For discussion purposes, let the M2M device generate a 0.6 for the random number, then the M2M may reference FIG. 5 (or some other representation of a cumulative distribution function) and follow a horizontal line representing value 0.6, which intersects the cumulative distribution function at transmission slot 95 (or transmission slot number 95). The M2M device may wait for the 95th transmission slot and transmit the initial power outage indicator in the 95th transmission slot (block 720). It is noted that an optional mapping of the transmission slot numbers to actual transmission slots may be performed, which may change a mapping of selected transmission slot (or selected transmission slot number) to an actual transmission slot.

Figure 8:
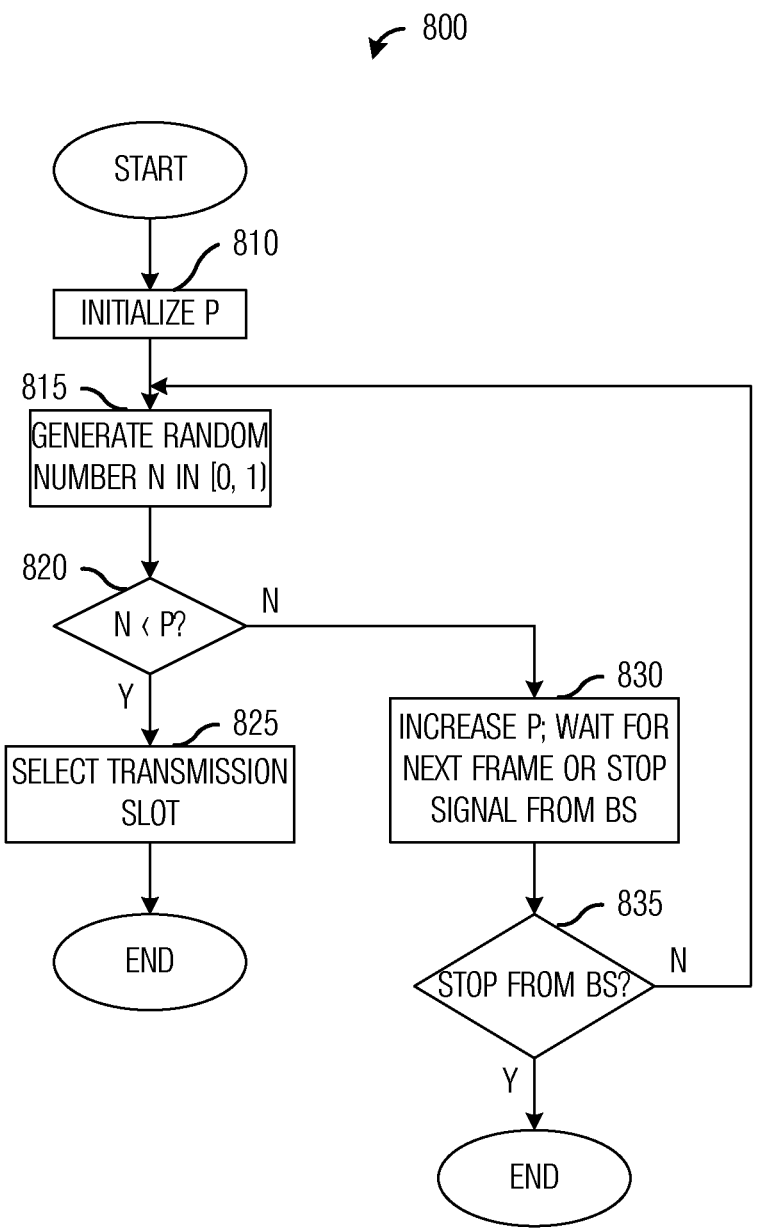
FIG. 8 illustrates an example flow diagram of operations in a M2M device as the M2M device selects a transmission slot according to a second example embodiment according to example embodiments described herein.

FIG. 8 illustrates a flow diagram of operations 800 in a M2M device as the M2M device selects a transmission slot according to a second example embodiment. Operations 800 may be indicative of operations occurring in a M2M device, such as M2M device 305, as the M2M device selects a transmission slot out of a plurality of transmission slots according to a non-uniform probability distribution function in order to transmit an initial power outage indicator to a base station serving the M2M device.

Operations 800 may begin with the M2M device initializing a variable P, which may be used to represent the non-uniform probability distribution function at for transmission slot t (block 810). In order to represent the non-uniform probability distribution function, the M2M may have a characterization of the non-uniform probability distribution function, such as a cumulative distribution function of the non-uniform probability distribution function. The M2M device generating a random number N (block 815). As an example, the M2M device may generate a random number having a uniform distribution ranging from [0, 1). However, other random number ranges may also be used.

The M2M device may perform a check to determine if the random number N is less than the variable P (block 820). If the random number N is less than the variable P, then the M2M device may select the transmission slot t as the transmission slot in which it transmits the initial power outage indicator (block 825). Alternatively, if the random number N is less than or equal to the variable P, then the M2M device may select the transmission slot t as the transmission slot in which it transmits the initial power outage indicator.

However, if the random number N is not less than the variable P, then the M2M device may increase the variable P to a value that corresponds to its value for a next transmission slot (block 830). The M2M device may then wait for the next transmission slot or for a stop signal from the base station. The M2M device may perform a check to determine if it has received the stop signal from the base station, which may indicate to the M2M device to stop operations (block 835). If it has received the stop signal, then the M2M device may stop its selection of a transmission slot. If it has not received the stop signal, then the M2M device may return to block 815 to generate another random number N and repeat a determination if it is to select the transmission slot.

It is noted that the first example embodiment and the second example embodiment for selecting a transmission slot presented in FIGS. 7 and 8 are meant to be illustrative examples of possible techniques for selecting a transmission slot according to a non-uniform probability distribution function. There are a large number of other techniques that may be used to select a transmission slot according to a non-uniform probability distribution function that may be used in their place.

Figure 9:
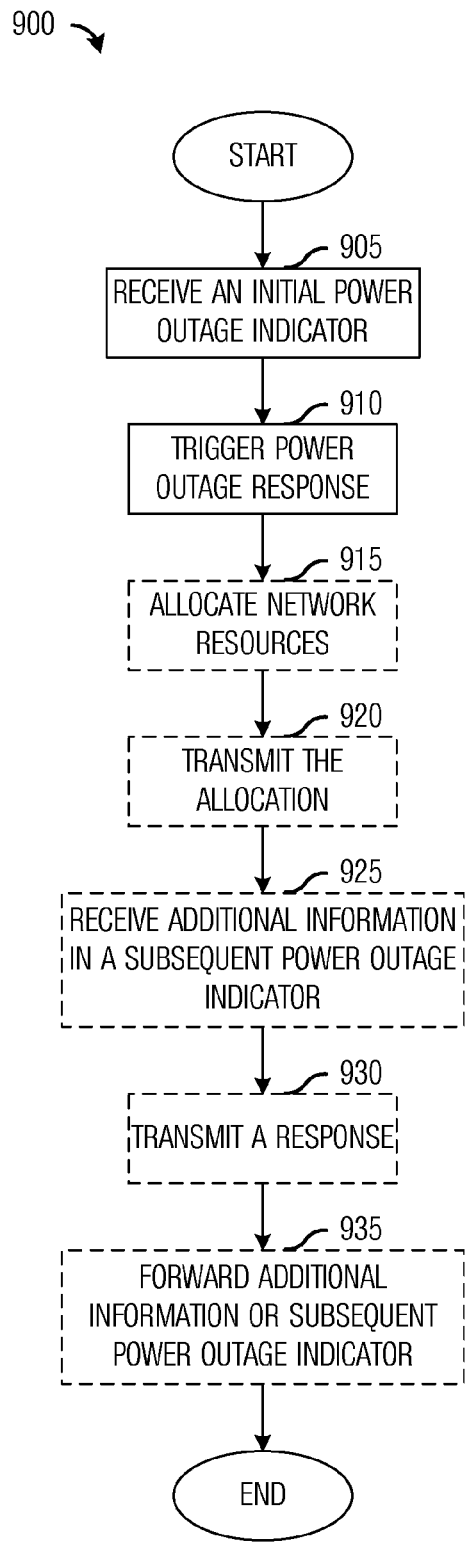
FIG. 9 illustrates an example flow diagram of operations in a base station as the base station handles a power outage according to example embodiments described herein.

FIG. 9 illustrates a flow diagram of operations 900 in a base station as the base station handles a power outage. Operations 900 may be indicative of operations occurring in a base station, such as base station 310, as the base station handles an occurrence of a power outage at one or more of M2M devices served by the base station.

Operations 900 may begin with the base station receiving an initial power outage indicator in a transmission slot (block 905). The initial power outage indicator may be a predetermined value or a predetermined waveform, which may be specified by a sequence of bits, such as a ranging code in a ranging slot in a WiMAX compliant communications system or a preamble in a RACH in a 3GPP LTE compliant communications system. It is noted that the ranging code or the preamble used as the initial power outage indicator may be a prespecified value specified by a technical standard or an operator of the communications system, or a configurable parameter configured during initialization, power up, and the like. The transmission slot in which the initial power outage indicator may be selected by a source of the initial power outage indicator according to a non-uniform probability distribution function. The non-uniform probability distribution function may increase (or decrease) monotonically with time, meaning that a probability of selecting a first transmission slot corresponding to time T+1 is at least equal to or greater than (or at most equal to or less than) a probability of selecting a second transmission slot corresponding to time T, where T+1>T.

The transmission slot used by the M2M device may be a random access transmission slot that may be used by an M2M device to transmit requests, information, and the like. As an example, in a WiMAX compliant communications system, the random access transmission slots may be referred to as ranging slots, while in a 3GPP LTE compliant communications system, the random access transmission slots may be referred to as RACHs.

The initial power outage indicator may inform the base station that a power outage has occurred at a M2M device that it is serving. However, due to the random access nature of the transmission slots, the initial power outage indicator may not be able to provide a significant amount of information, such as identifying information about the M2M device, a nature of the power outage, an extent of the power outage, and the like.

But, due to an inherent importance of a power outage and its impact on the communications system, the base station may respond accordingly to the initial power outage indicator by triggering a response to the power outage (block 910). The base station's response to the initial power outage indicator may include the base station informing entities in the communications system (such as M2M servers, M2M subscribers, M2M information processors, an OMS, and the like) about the power outage, expediting procedures for obtaining additional information regarding the power outage, and the like.

Since the M2M device may have a finite amount of time before it completely loses power, the base station may expeditiously allocate network resources for a transmission opportunity for the M2M device (block 915) and transmit information regarding the allocation to the M2M device (block 920). As an example, the base station may allocate network resources for the transmission opportunity and then broadcast the allocation stating that the transmission opportunity is for the M2M device that is the source of the initial power outage indication. As an example of expeditious allocation of network resources for the transmission opportunity, the base station may schedule a next available network resource to the M2M device, rather than scheduling the transmission opportunity for the M2M device using network resource that are available further away in time. As another example of expeditious allocation of network resources for the transmission opportunity, the base station may schedule an available network resource to the M2M device, where the available network resource occurs within a specified time window of when the base station received the initial power outage indicator, and the specified time window may be an operator specified time window, a technical standards specified time window, and the like. The base station may also move the scheduling of the transmission opportunity for the M2M device ahead of higher priority devices. It is noted that blocks 915 and 920 may be optional.

The base station may receive additional information from the M2M device in the form of a subsequent power outage indicator transmitted in the transmission opportunity (block 925). The subsequent power outage indicator from the M2M device may include identifying information for the M2M device, additional information about the power outage, additional information about the extent of the power outage, additional information about the nature of the power outage, and the like. The base station may transmit a response message to the additional information from the M2M device (block 930). The response message may include an indicator to the M2M device indicating that the base station received the subsequent power outage indicator. The response message may also inform the M2M device that it may power down after it receives the response message. It is noted that blocks 925 and 930 may be optional.

The base station may also send the subsequent power outage indicator or the additional information included therein to an entity(s) in the communications system, such as M2M servers, M2M subscribers, M2M information processors, an OMS, and the like (block 935). Since the base station may now have information about the M2M device that lost power, as well as potential information about the power outage, the base station may send the additional information to specific the entity(s) impacted by the power outage. As an example, if the M2M device is a weather monitoring device, then the entity(s) associated with weather monitoring may be provided the subsequent power outage indicator or the additional information included therein. Similarly, if the M2M device is a security monitoring device, then the entity(s) associated with security monitoring may be provided the subsequent power outage indicator or the additional information included therein.

Figure 10:
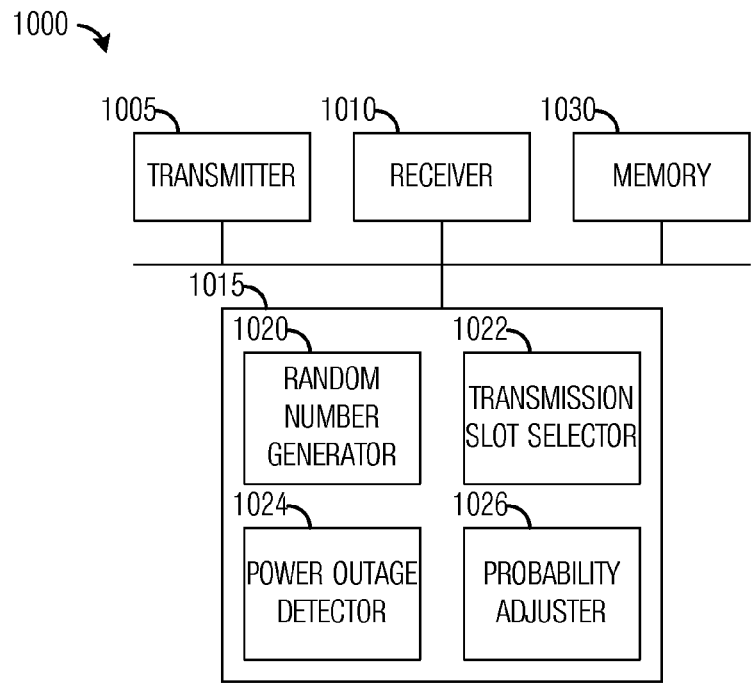
FIG. 10 illustrates an example diagram of a first communications device according to example embodiments described herein.

FIG. 10 illustrates a diagram of a communications device 1000. Communications device 1000 may be an implementation of a M2M device of a communications system. Communications device 1000 may be used to implement various ones of the embodiments discussed herein. As shown in FIG. 10, a transmitter 1005 is configured to send messages, information, beacons, and the like, and a receiver 1010 is configured to receive messages, information, beacons, and the like. Transmitter 1005 and receiver 1010 may have a wireless interface, a wireline interface, or a combination thereof.

A random number generator 1020 is configured to generate a random number within a desired range and according to a desired distribution, such as a uniform distribution, a normal distribution, an exponential distribution, and the like. A transmission slot selector 1022 is configured to select a transmission slot out of a plurality of transmission slots according to the random number generated by random number generator 1020 and a non-uniform probability distribution. A power outage detector 1024 is configured to detect an occurrence of a power outage. A probability adjuster 1026 is configured to adjust a variable according to a probability distribution, such as the non-uniform probability distribution. A memory 1030 is configured to store random numbers, power outage indicators, probability distributions, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while random number generator 1020, transmission slot detector 1022, power outage detector 1024, and probability adjuster 1026 may be software modules executing in a processor 1015, such as a microprocessor, a digital signal processor, a custom circuit, or a custom compiled logic array of a field programmable logic array.

Figure 11:
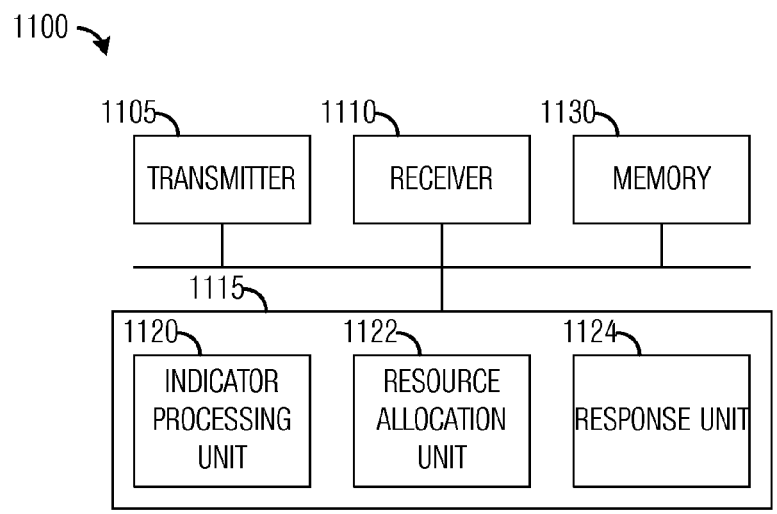
FIG. 11 illustrates an example diagram of a second communications device according to example embodiments described herein.

FIG. 11 illustrates a diagram of a communications device 1100. Communications device 1100 may be an implementation of a base station of a communications system. Communications device 1100 may be used to implement various ones of the embodiments discussed herein. As shown in FIG. 10, a transmitter 1105 is configured to send messages, information, beacons, and the like, and a receiver 1110 is configured to receive messages, information, beacons, and the like. Transmitter 1105 and receiver 1110 may have a wireless interface, a wireline interface, or a combination thereof.

An indicator processing unit 1120 is configured to process a power outage indicator from a M2M device. A resource allocation unit 1122 is configured to allocate a network resource for a transmission opportunity for the M2M device to obtain additional information about the power outage. A response unit 1124 is configured to forward information about the power outage to another entity(s), as well as expedites procedures to obtain additional information about the power outage. A memory 1130 is configured to store information about the power outage, power outage indicator, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, transmitter 1105 and receiver 1110 may be implemented as a specific hardware block, while indicator processing unit 1120, resource allocation unit 1122, and response unit 1124 may be software modules executing in a processor 1115, such as a microprocessor, a digital signal processor, a custom circuit, or a custom compiled logic array of a field programmable logic array.

Although the present disclosure and its advantages have been described in detail, it should be understood that various changes, substitutions and alterations can be made herein without departing from the spirit and scope of the disclosure as defined by the appended claims.

What is claimed is:

1. A method in a wireless device for reporting a power outage to a communications controller, the method comprising:
 detecting with the wireless device the power outage;
 selecting with the wireless device a transmission slot from a plurality of transmission slots in order to report the power outage to the communications controller, the transmission slot selected according to a non-uniform probability distribution function, the non-uniform probability distribution function is monotonic with time after the power outage, wherein the transmission slot is selected according to a time to live for the wireless device;
 transmitting an initial power outage indicator to the communications controller in the transmission slot selected;
 receiving an allocation of a network resource from the communications controller; and
 transmitting a subsequent power outage indicator to the communications controller using the network resource.

2. The method of claim 1, wherein selecting the transmission slot comprises
 selecting a virtual transmission slot from a plurality of virtual transmission slots according to the non-uniform probability distribution function; and
 mapping the virtual transmission slot to the transmission slot.

3. The method of claim 1, wherein the transmission slot comprises a ranging slot or a random access channel.

4. The method of claim 1, wherein the initial power outage indicator comprises a ranging code.

5. The method of claim 4, wherein the ranging code comprises a modulated binary sequence.

6. The method of claim 4, wherein the ranging code is one of a prespecified value and a configurable parameter.

7. The method of claim 1, wherein the non-uniform probability distribution function comprises an exponential distribution function, a monotonically increasing distribution function, or a monotonically decreasing distribution function.

8. The method of claim 1, wherein the non-uniform probability distribution function has a cumulative distribution function expressible as $$F(t) = \frac{N^{t/b} - 1}{N - 1},$$

where b is a backoff window size, t is a transmission slot number according to the initial ordering of the plurality of transmission slots, and N is a value of a configurable system parameter.

9. The method of claim 8, wherein the configurable system parameter is an Abnormal Power Down Ranging Opportunity Selection Parameter.

10. The method of claim 1, wherein the subsequent power outage indicator comprises identification information of a device impacted by the power outage, outage information associated with the power outage, extent information associated with an extent of the power outage, or a combination thereof.

11. A method in a wireless communication controller for responding to a power outage, the method comprising:
 receiving, at the wireless communication controller, in a transmission slot an initial power outage indicator from a served device out of several devices being served, use of the transmission slot having been selected by the served device according to a non-uniform probability distribution function, the transmission slot having been selected by the served device according to a time to live of the served device;
 allocating a network resource to the served device;
 transmitting an allocation of the network resource to the served device; and
 receiving a subsequent power outage indicator via the allocated network resource.

12. The method of claim 11, wherein the allocating and the transmitting are expedited.

13. The method of claim 11, further comprising transmitting initial related information about the initial power outage indicator to a potential entity possibly associated with the served device.

14. The method of claim 11, wherein the subsequent power outage indicator comprises identification information of the served device, outage information associated with the power outage, extent information associated with an extent of the power outage, or a combination thereof.

15. The method of claim 11, further comprising transmitting subsequent related information about the subsequent power outage indicator to a responsible entity associated with the served device, wherein the responsible entity is identified according to the subsequent power outage indicator.

16. A device comprising:
a processor configured to detect a power outage, and to select a transmission slot from a plurality of transmission slots in order to report the power outage to a communications controller, the transmission slot selected according to a non-uniform probability distribution function, the non-uniform probability distribution function is monotonic with time after the power outage, wherein the transmission slot is selected according to a time to live for the device; and
a transmitter operatively coupled to the processor, the transmitter configured to transmit an initial power outage indicator to the communications controller in the transmission slot selected; and
a receiver operatively coupled to the processor, the receiver configured to receive an allocation of a network resource from the communications controller, and wherein the transmitter is configured to transmit a subsequent power outage indicator to the communications controller using the network resource.

17. The device of claim 16, wherein the processor is configured to select a virtual transmission slot from a plurality of virtual transmission slots according to the non-uniform probability distribution function, and to map the virtual transmission slot to the transmission slot.

18. The device of claim 16, wherein the transmission slot comprises a ranging slot or a random access channel.

19. The device of claim 16, wherein the initial power outage indicator comprises a ranging code.

20. The device of claim 19, wherein the ranging code comprises a modulated binary sequence.

21. The device of claim 19, wherein the ranging code is one of a prespecified value and a configurable parameter.

22. The device of claim 16, wherein the non-uniform probability distribution function has a cumulative distribution function expressible as $$F(t) = \frac{N^{t/b} - 1}{N - 1},$$

where b is a backoff window size, t is a transmission slot number according to the initial ordering of the plurality of transmission slots, and N is a value of a configurable system parameter.

23. A communications controller comprising:
a receiver configured to receive in a transmission slot an initial power outage indicator from a served device out of several devices being served, use of the transmission slot having been selected by the served device according to a non-uniform probability distribution function, the transmission slot having been selected according to a time to live for the served device, wherein the receiver is configured to receive a subsequent power outage indicator, via an allocation of a network resource;
a processor operatively coupled to the receiver, the processor configured to allocate the network resource to the served device; and
a transmitter operatively coupled to the processor, the transmitter configured to transmit the allocation of the network resource to the served device.

24. The communications controller of claim 23, wherein the transmitter is configured to transmit initial related information about the initial power outage indicator to a potential entity possibly associated with the served device.

25. The communications controller of claim 23, wherein the transmitter is configured to transmit subsequent related information about the subsequent power outage indicator to a responsible entity associated with the served device, wherein the responsible entity is identified according to the subsequent power outage indicator.

* * * * *